US008984303B2

United States Patent
Egy et al.

(10) Patent No.: US 8,984,303 B2
(45) Date of Patent: Mar. 17, 2015

(54) SYSTEM FOR AUTOMATING STORAGE DEVICE SWAPS AND/OR REPLACEMENTS

(75) Inventors: Paul A. Egy, Denver, CO (US); Steven G. Hagerott, Wichita, KS (US); Luke Hodges, Wichita, KS (US); Jeremy Stover, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 1624 days.

(21) Appl. No.: 12/080,217

(22) Filed: Apr. 1, 2008

(65) Prior Publication Data

US 2009/0248926 A1  Oct. 1, 2009

(51) Int. Cl.
*G06F 1/26* (2006.01)
*G06F 13/40* (2006.01)
*G06F 11/22* (2006.01)

(52) U.S. Cl.
CPC ........ *G06F 13/4022* (2013.01); *G06F 11/2221* (2013.01)
USPC .......................................... 713/300

(58) Field of Classification Search
CPC .................. G06F 11/2094; G06F 11/2089
USPC .......................................... 713/300
See application file for complete search history.

(56) References Cited

U.S. PATENT DOCUMENTS

| 6,831,831 | B2 * | 12/2004 | Bicknell et al. | 361/679.33 |
|---|---|---|---|---|
| 6,957,291 | B2 * | 10/2005 | Moon et al. | 710/302 |
| 6,966,006 | B2 * | 11/2005 | Pacheco et al. | 713/300 |
| 7,308,512 | B1 * | 12/2007 | Son | 710/38 |
| 7,340,638 | B2 * | 3/2008 | Nicholson et al. | 714/6.11 |
| 7,730,235 | B2 * | 6/2010 | Kumasawa et al. | 710/36 |
| 2002/0007447 | A1 * | 1/2002 | Oue | 711/162 |
| 2007/0294433 | A1 * | 12/2007 | Leigh | 709/250 |

* cited by examiner

*Primary Examiner* — Kim Huynh
*Assistant Examiner* — Eric Chang
(74) *Attorney, Agent, or Firm* — Haynes and Boone, LLP

(57) ABSTRACT

A storage device manipulation system for implementing communications between a set of storage devices and a midplane is described. The storage device manipulation system may comprise a receiver and a communication system. The receiver may be configured to receive a command and generate a stimulus corresponding to the command. The communication system may be communicatively connected to the receiver and may be communicatively connectable to the set of storage devices and the midplane. The communication system may be configured to implement communication between the set of storage devices and the midplane based upon the stimulus by selectively providing power to the storage devices in the set of storage devices, selectively providing power to the ports on the midplane, and selectively establishing communication between the storage devices and the ports.

20 Claims, 3 Drawing Sheets

Logical State Table for 1X2 Configuration (1 Midplane Connection, 2 Drives) — 200

| | Drive Receptacle #1 | Drive Receptacle #2 | Emulated State | |
|---|---|---|---|---|
| Midplane Plug #1 | + | - | Drive in Slot #1 Optimal. | 202 |
| Midplane Plug #1 | - | - | Drive in Slot #1 Pulled. | 204 |
| Midplane Plug #1 | - | + | Drive in Slot #1 Replaced with Foreign Drive. | 206 |
| Midplane Plug #1 | + | + | INVALID STATE | 208 |

+ = Logically Connected  - = Logically Disconnected

FIG. 2

Logical State Table for 2X2 Configuration (2 Midplane Connections, 2 Drives) — 300

| | Drive Receptacle #1 | Drive Receptacle #2 | Emulated State | |
|---|---|---|---|---|
| Midplane Plug #1 | + | - | Drives in Slots 1 & 2 Optimal. | 302 |
| Midplane Plug #2 | - | + | | |
| Midplane Plug #1 | + | - | Drive in Slot 2 Pulled. | 304 |
| Midplane Plug #2 | - | - | | |
| Midplane Plug #1 | - | - | Drive in Slot 1 Pulled. | 306 |
| Midplane Plug #2 | - | + | | |
| Midplane Plug #1 | - | - | Drives in Slots 1 & 2 Pulled. | 308 |
| Midplane Plug #2 | - | - | | |
| Midplane Plug #1 | - | + | Drive from Slot 2 Inserted into Slot 1. | 310 |
| Midplane Plug #2 | - | - | | |
| Midplane Plug #1 | - | - | Drive from Slot 1 Inserted into Slot 2. | 312 |
| Midplane Plug #2 | + | - | | |
| Midplane Plug #1 | - | + | Drives from Slot 1 & 2 Inserted into Alternate Slots. | 314 |
| Midplane Plug #2 | + | - | | |
| Midplane Plug #1 | + | - | INVALID STATE | 316 |
| Midplane Plug #2 | + | - | | |
| Midplane Plug #1 | - | + | INVALID STATE | 318 |
| Midplane Plug #2 | - | + | | |

+ = Logically Connected  - = Logically Disconnected

FIG. 3

SYSTEM FOR AUTOMATING STORAGE DEVICE SWAPS AND/OR REPLACEMENTS

TECHNICAL FIELD

The present disclosure generally relates to the field of automated testing systems, and more particularly to an apparatus for automating storage device swaps and/or replacements of a system under test.

BACKGROUND

A storage product may include a set of two or more storage devices with certain functionalities and/or properties. In one instance, the storage product may be designed to be fault tolerant. For example, in an event that a storage device is disconnected from the storage product (e.g., due to failure of the storage device) and replaced with a new storage device, the storage product may be configured to reconstruct data stored on the failed storage device and store the reconstructed data to the new storage device. Testing functionalities of such storage product may require manual intervention. For example, to test fault tolerance of the storage product in the above example, a tester may need to manually disconnect a storage device from the storage product under test to simulate a failure, and replace the storage device with another storage device. Therefore, implementing an automated test for such storage product may be limited due to the necessity of manual intervention.

SUMMARY

A storage device manipulation system may implement communications between a set of storage devices, such as a disk drive or flash device, and a midplane. The storage device manipulation system may comprise a receiver and a communication system. The receiver may be configured to receive a command and generate a stimulus corresponding to the command. The communication system may be communicatively connected to the receiver and may be communicatively connectable to a storage device and the midplane. The communication system may be configured to implement communication between a storage device and the midplane based upon the stimulus by selectively providing power to the storage devices in the set of storage devices, selectively providing power to the ports on the midplane, and/or selectively establishing communication between the storage devices and the ports.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 2 is a table illustrating logical connections utilized by a storage device manipulation system;

FIG. 3 is another table illustrating logical connections utilized by a storage device manipulation system.

DETAILED DESCRIPTION

Reference will now be made in detail to the subject matter disclosed, which is illustrated in the accompanying drawings.

Figure 1:
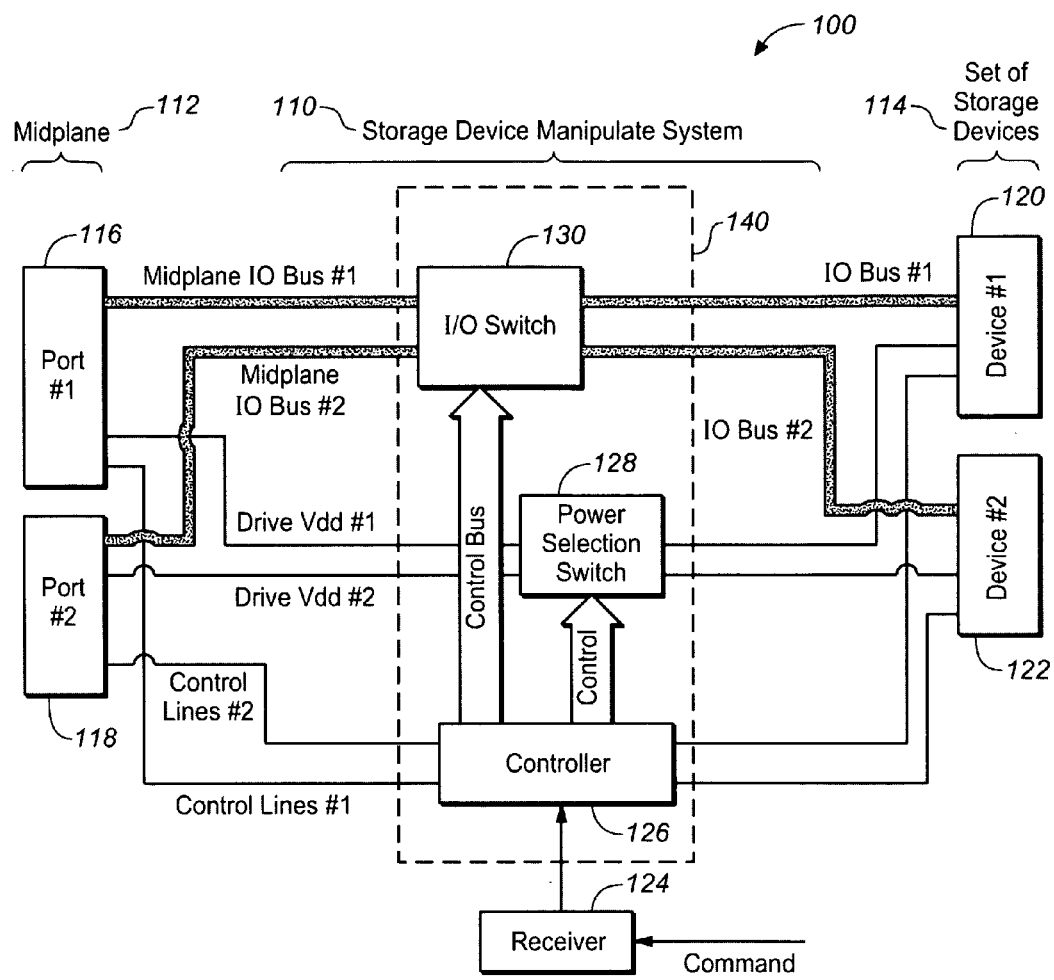
FIG. 1 is a block diagram illustrating a storage device manipulation system.

Referring now to FIG. 1, a storage product 100 utilizing a storage device manipulation system 110 of the present invention is depicted. The storage product 100 comprises a set of storage devices 114 having two or more storage devices for storing data, and a midplane 112 for providing access to the storage devices from an external component (e.g., a CPU or a network device). The midplane 112 may be hardware comprising a storage device facing side for providing connections to the storage devices, and an external component facing side for providing connections to external components. In one embodiment, the midplane 112 is a circuit board having the ability to connect devices to both sides of the circuit board. The storage device facing side of the midplane 112 comprises one or more ports (also known as slots or plugs) for providing connections to the storage devices. Each of the storage devices may be connected to a port on the midplane 112 to establish communication between a particular storage device and the midplane 112. In some embodiments, external components may only access the storage devices that have established communications with the midplane 112. In another embodiment, storage device manipulation system 110 may be implemented within an internal adapter card in a host where drives may be connected to the adapter card. The adapter card may be placed between storage devices, such as disk drives, and the host's internal adapter card, or ports on a motherboard.

The storage device manipulation system 110 may be utilized to electronically implement/manipulate communications between storage devices and the midplane 112 based on commands received by the storage device manipulation system 110. Such electronic manipulation may be utilized, for example, in an automated testing environment of the storage product 100. For example, the storage product 100 may be designed to emulate certain behaviors of a storage product including multiple drives. In a specific instance, the storage product 100 may be configured to emulate fault-tolerant behavior. To test fault tolerance of the storage product 100, the automated testing environment may send a replacement command to the storage device manipulation system 110 to replace a first storage device connected to the midplane 112 with a second storage device. Upon receiving the replacement command, the storage device manipulation system 110 electronically disconnects the first storage device from a port on the midplane that the first storage device is connected to, and then establishes a connection between the second device and the port. Thus, the storage device manipulation system may electronically achieve the replacement operation of the storage devices without manual intervention.

In one embodiment, the storage device manipulation system 110 comprises a receiver 124 and a communication system 140 including a controller 126, a power selection device 128 and an I/O switch 130. The receiver 124 is configured for receiving a command from the testing environment and generating a controller-level stimulus corresponding to the command received. The controller 126 receives the stimulus from the receiver 124 and configures the power selection device 128 and the I/O switch 130 based on the stimulus to electronically manipulate communications between the storage devices and the midplane. The command from the testing environment comprises a command type and the storage devices to be operated upon. In one embodiment, the receiver 124 is configured to process command types including a replacement command and a swap command.

A replacement command may be utilized to replace a storage device connected to a port on the midplane with another storage device. For example, the replacement command may cause the storage device manipulation system 110 to manipulate communication between storage devices and the midplane to replace a first storage device 120 connected to a first port 116 with a second storage device 122. At the completion of the replacement command, the first storage device 120 is disconnected from the first port 116, and the second storage device 122 is connected to the first port 116. The receiver 124 processes the replace command and generates a controller-level stimulus indicating the port and the storage device that is to be connected to the port. FIG. 2 is logical state table illustrating information a stimulus of the above exemplary replacement command may indicate. Since the replacement command may only operate on one midplane port, the port information may remain fixed. Each of the two storage devices may have two possible logical states (connected or disconnected), hence a total of 4 possible logical states are derived, as illustrated in FIG. 2. For instance, the stimulus generated for the replacement command in the above example would indicate the desire for a disconnection between the first storage device 120 and the first port 116, and a connection between the second storage device 122 and the second port 118. Therefore, the stimulus indicating logical state 206 is generated to electronically achieve this exemplary replacement.

A swap command may be utilized to manipulate communications between two storage devices and two ports on the midplane. FIG. 3 is a logical state table illustrating the possible communication configurations of two storage devices and two ports. For example, a connection may be established originally between the first storage device 120 and the first port 116, and between the second storage device 122 and the second port 118 (logical state 302). A swap command may cause the storage device manipulation system 110 to manipulate communication between storage devices and the midplane to swap the original connection by connecting the first storage device 120 to the second port 118, and connecting the second storage device 122 to the first port 116. A stimulus generated for the swap command would then indicate logical state 314 to electronically achieve this exemplary swap. It is understood that FIG. 3 also illustrates stimuli for indicating other possible logical states of a storage product having two storage devices and two ports. For example, logical state 304 indicates that a connection is established between the first storage device 120 and the first port 116 while the second storage device 122 is disconnected from the midplane (not connected to any port).

It is understood that not all possible communication configurations are required to be processed by the communication system 140. For example, a single storage device may not be connected to two different ports simultaneously. A single port may also not be connected to two different storage devices simultaneously. Therefore, such configurations may be interpreted to be invalid (as indicated in the logical state tables). It is contemplated that the controller 126 may be configured to automatically discard a stimulus representing an invalid logical states, or to indicate an error back to the receiver 124. It is also understood that the stimulus may utilize a predetermined data format for indicating logical state information. In one specific embodiment, the stimulus is a byte of data.

The communication system 140 processes the stimulus and manipulates the communication between the storage devices and the ports accordingly. The controller 126 receives the stimulus from the receiver 124 and configures the power selection device 128 and the I/O switch 130 based on the logical state indicated by the stimulus. In one embodiment, the controller 126 is an integrated circuit capable of executing a predefined set of logic. The power selection device 128 is configured for selectively providing power to the storage devices and/or ports connected to the power selection device 128 based on control signals received from the controller 126. The I/O switch 130 is configured for selectively establishing communications between the storage devices and the ports connected to the I/O switch 130 based on control signals received from the controller 126.

For example, when a stimulus indicating logical state 206 is received, the controller 126 sends control signals to the power selection device 128 to disable power supply to the first storage device 120, and to enable power supply to the second storage device 122. The controller 126 also sends control signals to the I/O switch 130 to disable communication between the first storage device 120 and the first port 116, and to enable communication between the second storage device 122 and the first port 116. In another example, when a stimulus indicating logical state 314 is received, the controller 126 sends control signals to the power selection device 128 to enable power supply (if not already so powered) for the first and the second storage device. The controller 126 also sends signals to the I/O switch 130 to manipulate communications between the storage devices and the ports so that the first storage device 120 is connected to the second port 118, and the second storage device 122 is connected to the first port 116. It is understood that stimuli representing other logical states illustrated in FIGS. 2 and 3 may be processed accordingly by the communication system 140 based on the information indicated by the stimuli.

Figure 4:
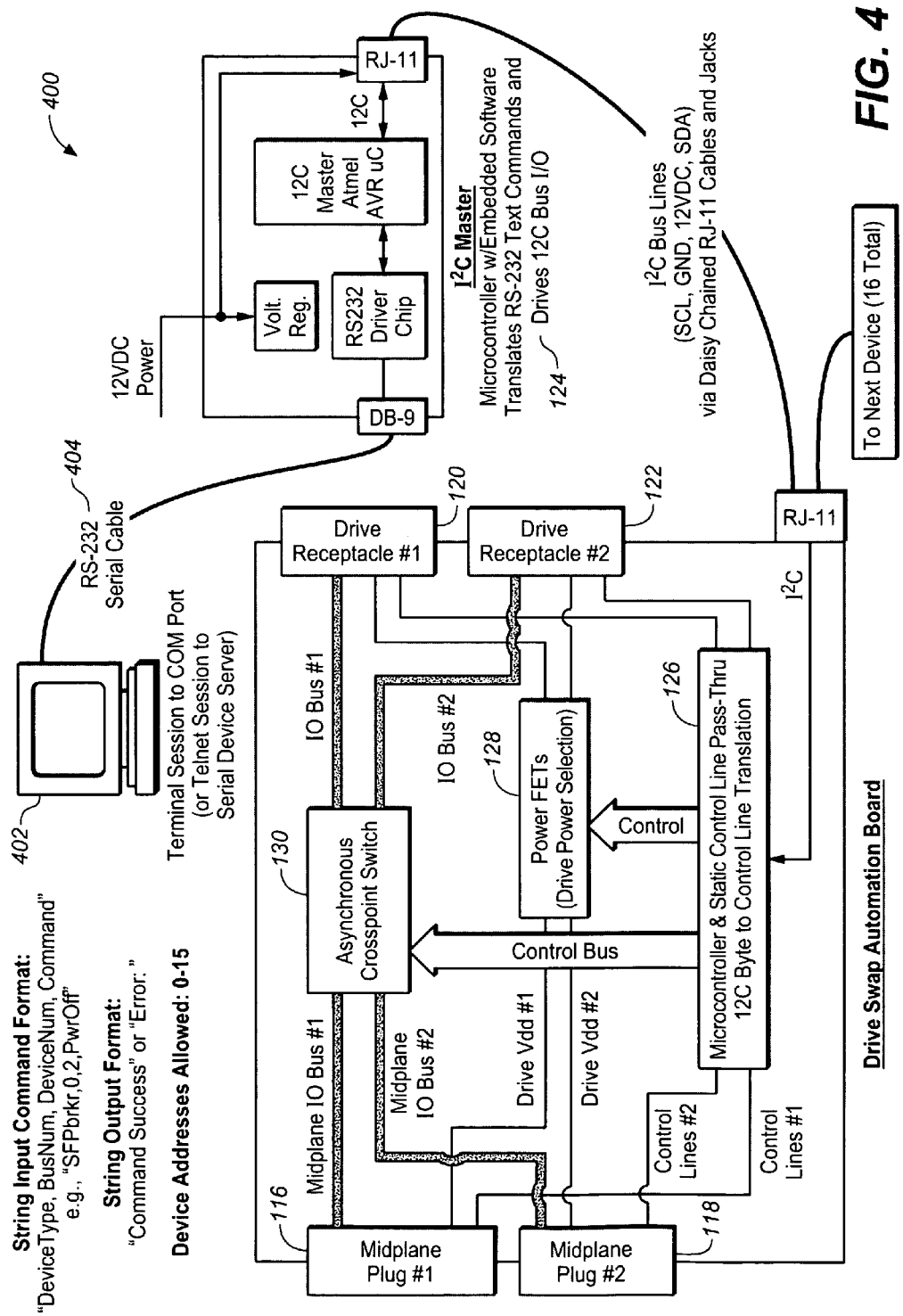
FIG. 4 is another block diagram illustrating a storage device manipulation system.

Referring now to FIG. 4, a block diagram of a system under test 400 utilizing a storage device manipulation system 110 of the present invention is depicted. In one specific embodiment, the system under test 400 comprises a host 402 configured for sending a command to the receiver 124 via a communication line 404. The receiver 124 comprises a microcontroller with embedded software for translating the command received from the communication line 404 and generating a controller-level stimulus. In one instance, the communication line 404 is a RS-232 serial cable carrying an RS-232 command, and the controller-level stimulus is generated as an I$^2$C command. In one specific embodiment, the controller 126 is a programmable system on chip (PSOC) for processing the I$^2$C command received from the receiver 124, the power selection device 128 is a field-effect transistor (FET), and the I/O switch 130 is an asynchronous crosspoint switch. It is contemplated that the I/O switch 130 may be protocol independent, hence capable of supporting various I/O protocols including, but not limited to, Fibre Channel and/or SAS. It is also contemplated that the host 402 may comprise a session for accepting user and/or network commands, or a computer for executing a list of predefined commands (e.g., the host 402 may be utilized for automated testing).

It is further contemplated that more than one communication systems 140 may be coupled with one receiver 124. For example, a system under test may comprise a first midplane for communicating with a first set of storage devices and a second midplane for communicating with a second set of storage devices. Testing such a system may require a first communication system (including a controller, a power selection device and an I/O switch) for manipulating communication between the first midplane and the first set of storage devices, and a second communication system for manipulating communication between the second midplane and the second set of storage devices. The receiver 124 may be configured to send stimulus to either one of the communication systems utilizing an identifier. In one embodiment, an I²C address for each of the communication systems is utilized as the identifier.

It is understood that the number of ports and storage devices comprised in a storage product may vary without departing from the scope and spirit of the present disclosure. For example, the storage product may include a midplane with three ports for communicating with three storage devices. The storage device manipulation system 110 utilized by such a storage product may be configured with a set of logical states representing possible communication configurations of the three ports and storage devices, and controls for the power selection device and the I/O switch accordingly.

It will be appreciated that the storage device manipulation system 110 may be utilized outside of a testing environment. For example, the storage device manipulation system 110 may support device swaps for a purpose of automatically rebooting a host from multiple storage devices to support multiple operating systems or host configurations. In one instance, the storage device manipulation system is utilized for remote hard disk replacement. For example, in case of a real-world hard disk (storage device) 120 failure, a user may utilize the storage device manipulation system 110 to replace the failed hard disk 120 with a second hard disk 122, even when physical access to the hard disks is not feasible (e.g., on a remotely accessed network computer). In another instance, the storage device manipulation system 110 may be utilized to configure drive connections of a multi-boot system having different operating systems on different disk drives. For example, the dual boot system may comprise a first disk drive 120 loaded with a first operating system and a second disk drive 122 loaded with a second operating system. The dual boot system may utilize the storage device manipulation system 110 to configure drive selection in order to control the first or the second operating system to boot.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An apparatus, comprising:
   a communication system being connectable to a set of storage devices comprising at least two storage devices and a midplane comprising at least two ports, wherein the communication system includes a switch operable to communicatively couple each of the at least two ports to each of the at least two storage devices,
   wherein the communication system is configured to implement communication between the set of storage devices and the midplane by selectively providing power to the at least two storage devices, and selectively providing power to the at least two ports
   wherein based upon receiving a swap command, the communication system is configured to:
   electronically swap a first storage device of the at least two storage devices with a second storage device of the at least two storage devices by:
     using the switch to communicatively disconnect the first storage device from a first port of the at least two ports with which the first storage device was previously in communication; and
     using the switch to communicatively connect the first storage device to a second port of the at least two ports with which the first storage device was previously not in communication, and
   wherein based upon receiving a replace command, the communication system is configured to:
   electronically replace the first storage device of the at least two storage devices with the second storage device of the at least two storage devices by:
     using the switch to communicatively disconnect the first storage device from the first port with which the first storage device was previously in communication; and
     using the switch to communicatively connect the second storage device to the first port with which the second storage device was previously not in communication.

2. The apparatus of claim 1, wherein the communication system comprises a controller.

3. The apparatus of claim 2, wherein the controller is a Programmable System-on-Chip (PSoC).

4. The apparatus of claim 1, wherein the communication system comprises a power selection device.

5. The apparatus of claim 4, wherein the power selection device is a field-effect transistor (PET).

6. The apparatus of claim 1, wherein the switch is an asynchronous crosspoint switch.

7. The apparatus of claim 1, wherein the communication system is configured to electronically replace the first storage device of the at least two storage devices with the second storage device of the at least two storage devices by further:
   using the switch to communicatively disconnect the second storage device from the second port with which the second storage device was previously in communication; and
   using the switch to communicatively connect the first storage device to the second port with which the first storage device was previously not in communication.

8. An apparatus, comprising:
   means for receiving a command;
   means for communicating between a set of storage devices, said set of storage devices comprising at least two storage devices and a midplane comprising at least two ports, the communicating means communicatively connected to the receiving means, the communicating means coupling the set of storage devices and the midplane via a switching means;
   means for supplying power selectively to the at least two storage devices and the at least two ports,
   wherein based upon receiving a swap command, the communicating means is configured to:
   disconnect a first storage device of the at least two storage devices from a first port of the at least two ports using the switching means; and
   connect the first storage device to a second port of the at least two ports using the switching means, and
   wherein based upon receiving a replace command, the communicating means is configured to:
   disconnect the first storage device from the first port using the switching means; and connect a second storage device of the at least two storage devices to the first port using the switching means.

9. The apparatus of claim 8, wherein the communicating means comprises a controller.

10. The apparatus of claim 9, wherein the controller is a Programmable System-on-Chip (PSoC).

11. The apparatus of claim 8, wherein the communicating means comprises a power selection device.

12. The apparatus of claim 11, wherein the power selection device is a field-effect transistor (FET).

13. The apparatus of claim 8, wherein the switching means comprises an I/O switch.

14. The apparatus of claim 13, wherein the I/O switch is an asynchronous crosspoint switch.

15. An apparatus, comprising:
   a controller for receiving a command, the controller being communicatively connectable to a set of storage devices and a midplane comprising at least two ports, said set of storage devices comprising at least two storage devices;
   a power selection device coupled with the controller for selectively providing power to the at least two storage devices and for selectively providing power to the at least two ports;
   an I/O switch coupled with the controller for selectively establishing communication between the at least two storage devices and the at least two ports;
   wherein the controller is configured to selectively electronically connect the set of storage devices and the midplane to implement communication between the set of storage devices and the midplane based upon the command utilizing the power selection device and the I/O switch,
   wherein based upon receiving a swap command, the controller is configured to:
      using the I/O switch, disconnect a first storage device of the at least two storage devices from a first port of the at least two ports that the first storage device was previously in communication with; and
      using the I/O switch, connecting the first storage device to a second port of the at least two ports that the first storage device was previously not in communication with, and
   wherein based upon receiving a replace command, the controller is configured to:
      using the I/O switch, disconnect the first storage device from the first port that the first storage device was previously in communication with; and
      using the I/O switch, connect a second storage device of the at least two storage devices to the first port that the second storage device was previously not in communication with.

16. The apparatus of claim 15, wherein the controller is configured to operate in a swap mode for implementing communication between the set of storage devices and the midplane to electronically achieve the swap.

17. The apparatus of claim 15, wherein the controller is configured to operate in a replacement mode for implementing communication between the set of storage devices and the midplane to electronically achieve the replacement.

18. The apparatus of claim 15, wherein the controller is a Programmable System-on-Chip (PSoC).

19. The apparatus of claim 15, wherein the power selection device is a field-effect transistor (FET).

20. The apparatus of claim 15, wherein the I/O switch is an asynchronous crosspoint switch.

* * * * *